Patented Dec. 18, 1951

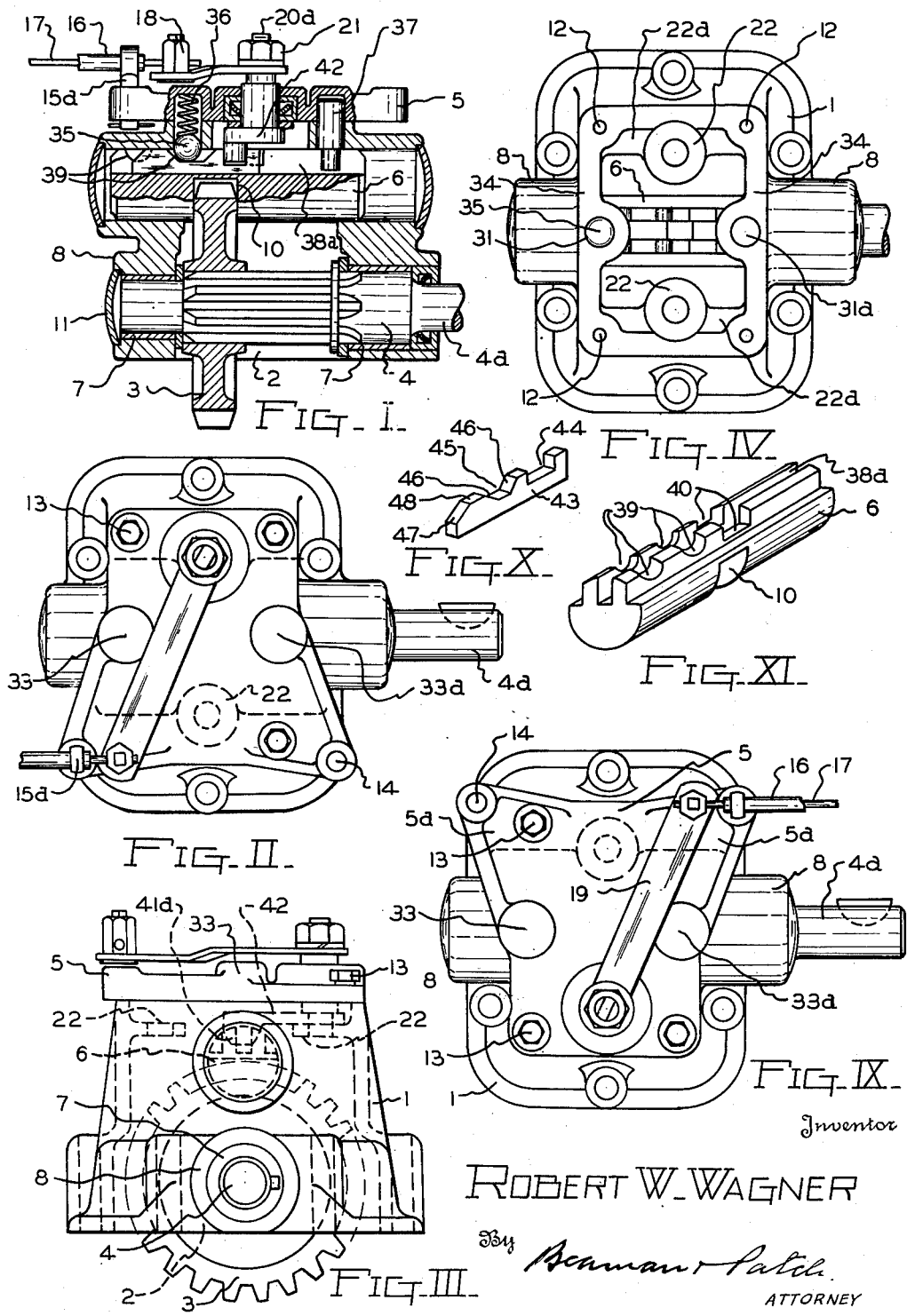

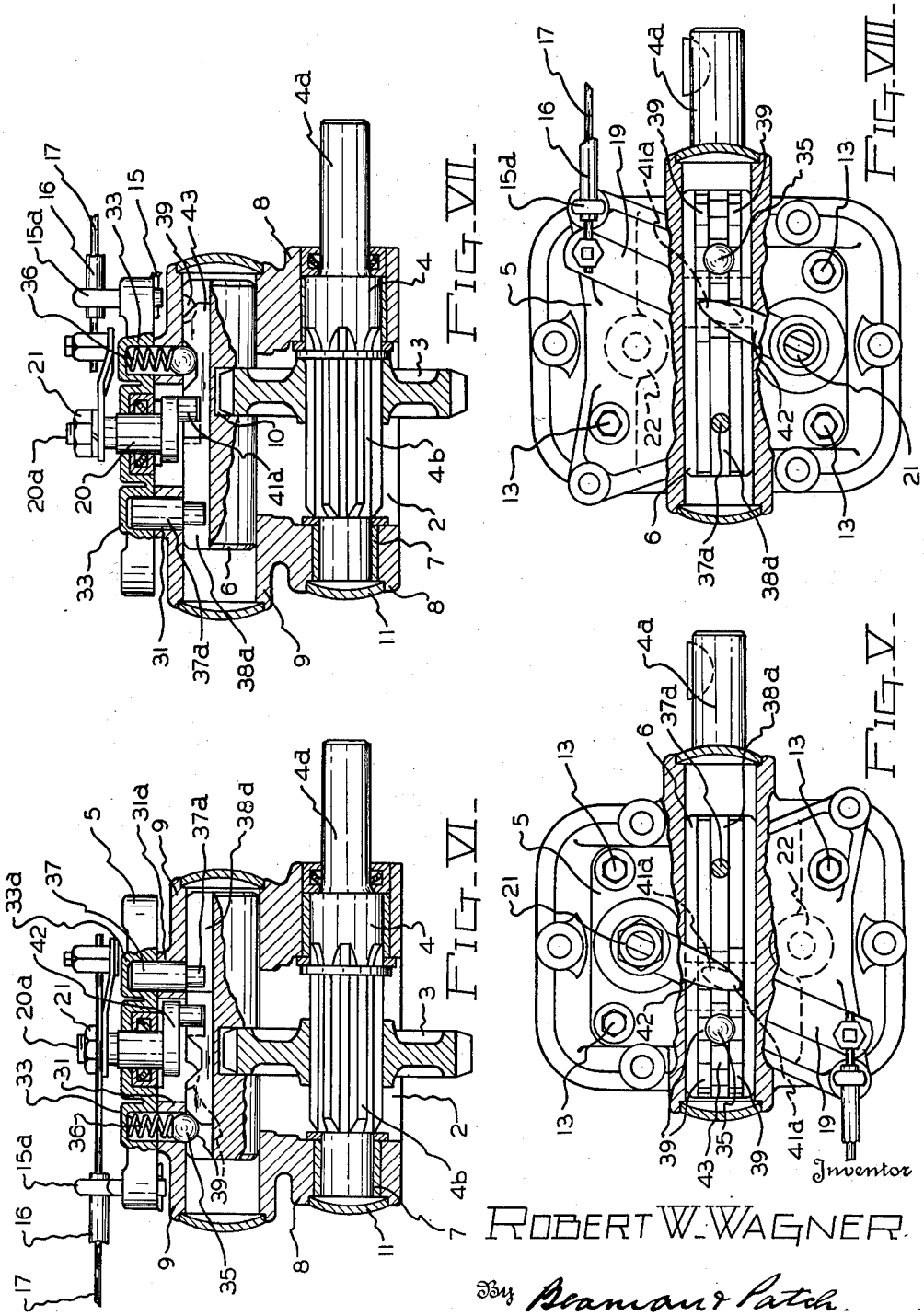

2,578,867

UNITED STATES PATENT OFFICE 2,578,867

POWER TAKE-OFF

Robert W. Wagner, Chelsea, Mich.

Application March 1, 1948, Serial No. 12,390

1 Claim. (Cl. 74—15.86)

This invention relates to power take-off apparatus and to the gear shift mechanism used in connection therewith, such power take-off apparatus being of the kind employed for attachment to the casing of a motor vehicle gear transmission and incorporating a gear wheel which is axially shiftable along its supporting countershaft, into one or another indexed position, by a shifting mechanism which incorporates an axially movable gear shifter bar and a lever actuatable to so move this bar.

In connection with such power take-off apparatus, it happens in practice that whereas movement of the gear shifting mechanism of the said gear wheel in one direction satisfies one set of requirements, movement of the mechanism or gear wheel in the opposite direction to fulfill the same operating condition is required to meet another set of requirements.

It is an object of the invention to provide a power take-off apparatus of the above kind, the construction and arrangement of the casing and shifter mechanism of which is such as permits either set of such requirements to be satisfied with the use of standardized parts whereby these can readily be assembled in operative position to provide for the required operating movements to take place in one direction of movement or in the opposite direction of movement.

It is thus an object of the invention to provide a power take-off apparatus having a casing for supporting and enclosing the operating parts of the gear, including the power take-off shaft and the axially shiftable gear wheel supported thereon, which casing has a detachable cover plate which is capable of being mounted in position upon the casing in one or the other of two alternative positions, in one of which positions one such set of operating requirements is capable of being satisfied whereas in the other such position of the cover plate the other set of operating conditions is capable of being satisfied. The casing incorporates alternative bearing supports for a spindle employed in order to mount the gear wheel shifter lever and associated mechanism for the desired oscillatory motion. The casing also incorporates a pair of symmetrically arranged sockets, in which a resiliently mounted locking ball or like detent and indexing member and a guide pin for the axially slidable shifter bar are capable of being optionally mounted, depending upon the particular set of operating conditions which the power take-off apparatus is intended to satisfy and the required direction of movement of the shifter bar.

These and other objects of the invention will appear clear from a consideration of the following detailed description with reference to the accompanying drawings which disclose one practical embodiment of the invention, by way of example, and in which:

Fig. I is a vertical sectional view of this embodiment of the invention with the gear wheel on the power take-off shaft shown in its one extreme position adjacent one side wall of the gear casing and with the gear shifter mechanism and associated parts, including the reversible cover plate of the gear casing, correspondingly assembled, Fig. II is a plan view of Fig. I, Fig. III is a righthand elevational view of Fig. I, Fig. IV is a plan view of Fig. I with the reversible cover plate removed, along with the operating lever of the gear shifter mechanism, Fig. V is a plan view similar to Fig. II but showing the central portion of the reversible cover plate broken away to reveal the axially movable shifter bar and associated parts, Fig. VI is a view similar to Fig. I but showing the gear wheel on the power take-off shaft adjusted into its other extreme position upon the shaft, with the shifter mechanism correspondingly adjusted, Fig. VII is a view similar to Fig. I but showing the gear wheel cover, gear shifter bar and associated parts, and also the reversible cover plate of the gear casing, assembled in position to provide the alternative directional movement and positioning of the gear wheel and such parts, Fig. VIII is a view similar to Fig. V but corresponding to the alternative position of the parts as illustrated in Fig. VII, Fig. IX is a plan view of Fig. VII, and Figs. X and XI are perspective views of the slide plate and shifter bar respectively, the slide plate being adapted for sliding movement upon and with respect to the shifter bar.

Referring to the drawings, wherein like parts have been given the same reference numerals, power take-off apparatus is provided comprising a hollow casing 1, having an opening 2 on one side through which a portion of a spur gear wheel 3 on the power take-off shaft 4 projects, and a detachable and reversible cover plate 5 on the opposite side.

The power take-off shaft extends transversely within the casing in parallel relationship to an axially movable shifter bar 6, which latter is completely confined within the casing, whereas the power take-off shaft has a portion 4a which projects outside the casing and serves for the coupling thereto of the machinery or apparatus required to be driven from the power take-off apparatus.

The power take-off shaft is rotatably mounted within bearings 7, provided within boss portions 8 of opposite side walls of the casing, and the shaft has an axially splined portion 4b upon which the gear wheel 3 is mounted for its required axial movement.

The gear shifter bar 6 has its end portions mounted within axially aligned bosses 9 which are symmetrically disposed upon opposite sides of the casing and permit the shifter bar to partake of the required oscillatory motion, which motion is imparted to the gear wheel 3 by the inner peripheral portion thereof being positioned within a transverse slot 10 in the shifter bar.

End press fitted caps 11 serve to close and seal the opposite ends of the aligned sockets formed by the bosses 9, whereas a similar press fitted cap 11 is provided to close and seal the end of the boss 8 containing the end of the power take-off shaft remote from the projecting end portion 4a thereof.

The detachable and reversible cover plate 5 has a symmetrical series of apertures conveniently located at the four corners of a rectangle and disposed to coincide with correspondingly situated screw-threaded openings 12 formed in the upper end of the casing at the corners of the edges thereof over which the cover plate 5 is applied and affixed in position by means of the screw bolts 13. The cover plate 5, at one end thereof, is also formed with integral triangular-like portions 5a having at their apexes symmetrically disposed holes 14 either of which can optionally be employed to receive a pin 15 providing a circular bearing 15a for the passage of a cable or like flexible connection 16 enclosing a flexible wire 17 itself anchored to a stud 18 provided upon the outer free end of a lever 19 constituting the oscillatable lever of the shifter mechanism and by the oscillation of which lever, through appropriate pulling or pushing of the wire 17, the shifter bar 6 is moved bodily in one direction or the other within the aforesaid bosses 9.

The lever 19 is mounted for its required pivotal movement by means of a spindle 20 which is removably secured in position through the medium of the nut 21 and screw threaded extremity 20a of the spindle and is capable of being optionally mounted in either one of two bearing bushes 22 depending upon the required positioning of the operating parts of the gear.

These bushes 22 are symmetrically disposed and provided upon cross webs 22a (Fig. IV) of the casing structure.

The arrangement is such that the lever 19 can be mounted for swinging movement from left to right, in the position of the parts as seen in Figs. I to VI, in order to shift the gear wheel 3 from its one extreme position, as seen in Fig. I, to its other extreme position, as seen in Fig. VI. Or the lever 19 can be mounted in the alternative bearing bush 22, shown dotted in Fig. II, for swinging movement from right to left in the alternative position of the parts, as shown in Figs. VII to IX, in order to shift the gear wheel 3 from its one extreme position, as seen in Fig. VII to its other extreme position, corresponding to the position of the gear wheel as seen in Fig. VI.

The reversible cover plate 5 is also provided with a pair of symmetrical bosses 33, 33a closed to the outside of the cover plate and open on the inside thereof to a pair of coincident sockets 31, 31a centrally provided upon the opposed side edges 34 (Fig. IV) of the open side of the casing over which the cover plate is affixed.

With the cover plate affixed in position as shown in Figs. I, VI and VII, in particular, these bosses 33, 33a and sockets 31, 31a combine to form common pockets for the optional retention therein either of a ball or like detent member 35 and loading spring 36 therefor or of a guide pin 37 having a depending portion 37a engageable within a portion 38a of a longitudinal channel 38 formed in the shifter bar 6 and clearly shown in Fig. XI.

The channel 38 of the shifter bar is transversely notched at longitudinally spaced intervals to provide two indexing locations 39 for the ball 35 and a clearance slot 40 for the outside portions 41a (Figs. V and VIII) of the substantially elliptical section depending lug portion 41 of the free end of a crank 42 provided on the inner end of the spindle 20 for oscillation with the latter.

The channel 38 of the shifter bar serves to accommodate, for reciprocable sliding movement therein, the slide plate 43 (Fig. X) which latter is reciprocable relatively to the shifter bar (by which it is carried) as well as being reciprocable with the latter under the control of the shifter mechanism, constituted by the cable combination 16, 17 (with its remote actuating knob, push button or like part, not shown) lever 19 and crank 41, 42. To this end the sliding plate 43 has a transverse slot 44 in which the central and wider portion of the depending crank lug 41 engages and another transverse slot 45 having oppositely directed inclined walls 46 forming cam surfaces for engagement with the spring loaded ball 35 as the slide plate is shifted along the guide channel 38. The plate 43 is also formed with a further inclined cam forming surface 47 at one end thereof adapted also for engagement with the ball 35.

In operation, and with the parts as shown in Figs. I, II and V a pushing motion applied to the lever 19 will swing the latter about its spindle 20 and thereby cause the crank portion 41 first to exert a right hand pressure to the slide plate 43, to shift the latter to the right relatively to the shifter bar 6, and then to shift both slide plate and shifter bar bodily to the right to the extent shown in Fig. VI, the effect of which is to shift the gear wheel 3 from its one extreme position, as shown in Fig. I, to its other extreme position, as shown in Fig. VI. In the position of the parts as shown in Fig. I the spring 36 and the ball 35 are accommodated beneath the boss 33 whereas the guide pin 37 is accommodated beneath the boss 33a. Also in this position of the parts the shifter bar 6 is mounted within the casing 1 and in the opposed axial bosses 9 with the end thereof containing the ball slots 39 and crank slot 40 on the lefthand side and the ball 35 is engaged in its one indexed position corresponding to this position of the gear wheel 3. The first part of the right hand swinging movement of the lever 19 will, by sliding the slide plate 43 to the right relatively to the shifter bar 6, cam the ball 39 upwards against its spring 36, due to the camming action of the lefthand inclined cam surface 46. The ball will be held lifted while the top surface portion 48 of the slide plate 43 is moved past it, at which time however the crank portion 41 will have engaged the right hand end of the slot 40 in the shifter bar to shift the latter bodily to the right, along with the slide plate 43, and into the position shown in Fig. VI where the inclined cam surface 47 of the slide plate 43 is situated opposite the ball and the latter thereby automatically "clicks" into its other indexed position. This relative sliding movement of the slide plate 43 is permitted to take place due to the fact that the central portion of the depending part 41 of the crank has but a small clearance fit within the slot 44 of the slide plate, whereas the end portions 41*a* of the crank part 41 have a relatively large clearance with respect to the transverse slot 40 in the shifter bar 6, giving rise therefore to a limited lost motion action. The same sequence of operations take place, but in the reverse sense, by a return swinging of the lever 19 to the left from the position as shown in Fig. VI.

To position the parts of the power take-off apparatus for a reverse directional movement of the gear wheel 3 and the lever 19, it is merely necessary to transpose the ball 35 and spring 36 and the guide pin 37, to reverse the cover plate 5 and shifter bar 6, and to mount the lever spindle 20 within the opposite bushing 22 to that compared with Fig. II.

It will be appreciated that the symmetrical arrangement of the various bosses and cover plate apertures above described and shown in the drawings permit of this reversibility being readily affected and with the employment of the same parts, which accordingly can be standardized. In production the parts of the power take-off apparatus would be assembled to meet either of the operating conditions, that is either that according to Figs. I to VI or that is according to Figs. VII to VIII.

Having thus described one practical embodiment of the invention and the manner in which the same is to be carried into effect and without limiting myself to the precise constructional features shown in the drawings, (it being understood that modifications are possible to suit particular requirement or operating conditions) what I claim as novel and wish to secure as my patent monopoly is:

Power take-off apparatus comprising in combination, hollow casing structure with side walls having bearing bushings, shafts mounted in said bushings in parallel spaced relation, including a rotary shaft and an axially slidable shifter shaft, said rotary shaft having a splined portion with a gear ring mounted on said shaft portion, said shifter shaft including a surface recess with which said gear ring is held engaged to partake of axial adjustment of said shifter shaft, said shifter shaft having axially spaced depressions, including a depression in which a crank actuator for the shifter bar engages and axially spaced depressions in which indexing detent means is optionally engageable to hold the shifter bar in different indexed positions, said casing structure having an opening exposing the said gear ring and, adjacent said shifter bar, another opening, a removable cover plate for said second mentioned casing opening, said cover plate having symmetrical openings for receiving securing means detachably securing the cover plate upon the casing structure, said cover plate having, additionally, pairs of symmetrical sockets, including a pair of sockets in either of which a guide post member is optionally engageable and a pair of sockets in which said detent means and a rotary restraining guide pin member for said shifter shaft are interchangeably engageable, said guide cover plate also having a pair of symmetrical bearing sockets in which said actuator crank is optionally engageable, said cover plate being reversible in position upon said casing structure and said actuator crank, guide pin member and detent means being also interchangeable with their respective said sockets to enable the shifter shaft and associated actuator parts to be positioned for right or left hand actuation.

ROBERT W. WAGNER.

REFERENCES CITED

The following references are of record in the file of this patent:

UNITED STATES PATENTS

| Number | Name | Date |
|---|---|---|
| 1,802,419 | Freeman et al. | Apr. 28, 1931 |
| 2,100,678 | Wagner | Nov. 30, 1937 |
| 2,162,979 | Simpson | June 20, 1939 |

FOREIGN PATENTS

| Number | Country | Date |
|---|---|---|
| 143,482 | Germany | Aug. 14, 1903 |